March 1, 1960  O. H. CRITCHLEY ET AL  2,927,292
ELECTRICAL RESISTANCE STRAIN GAUGE CELLS OR CAPSULES
Filed June 17, 1957

INVENTORS
Octavius H. Critchley
Albert E. Bennett
William A. Sammons

By Stevens, Davis, Miller & Mosher
ATTORNEYS

March 1, 1960     O. H. CRITCHLEY ET AL     2,927,292
ELECTRICAL RESISTANCE STRAIN GAUGE CELLS OR CAPSULES
Filed June 17, 1957     6 Sheets-Sheet 5
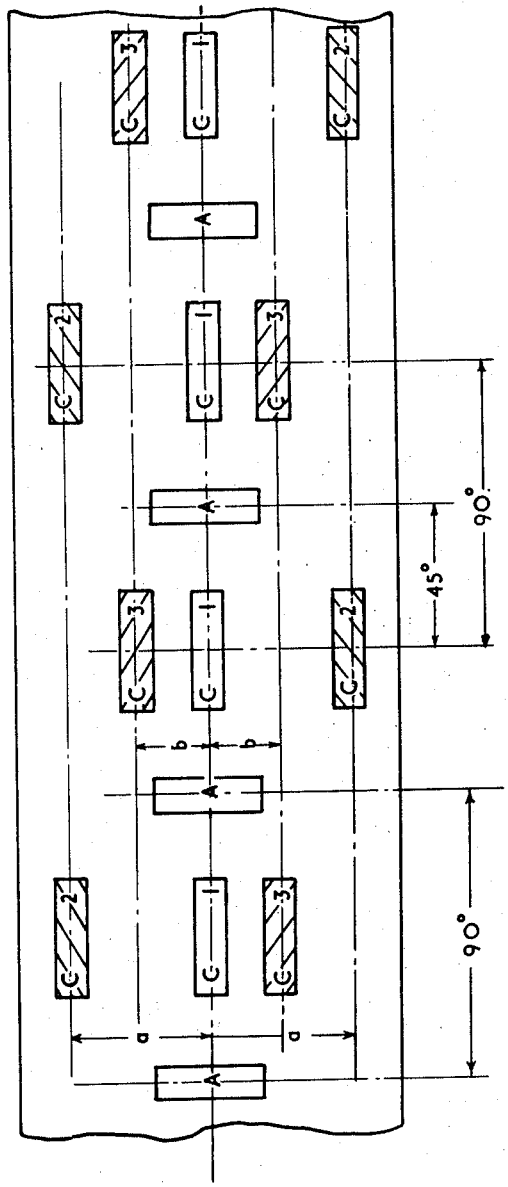

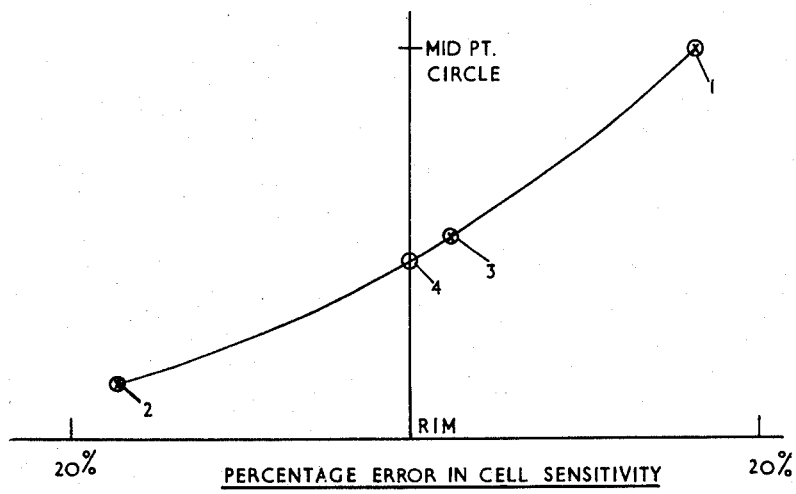

United States Patent Office 2,927,292
Patented Mar. 1, 1960

2,927,292

ELECTRICAL RESISTANCE STRAIN GAUGE CELLS OR CAPSULES

Octavius Hunt Critchley, Hounslow, Albert Edward Bennett, Ewell, and William Albert Sammons, Harrow, England, assignors to Coal Industry (Patents) Limited, London, England, a British company Application June 17, 1957, Serial No. 666,146

Claims priority, application Great Britain June 18, 1956

9 Claims. (Cl. 338—3)

This invention relates to electrical resistance strain gauge cells or capsules. An electrical resistance strain gauge load cell is a device employed in the electrical determination of a load which is applied to the cell, and it comprises bonded electrical resistance strain gauge attached to a load-sensitive member which suffers strain under the load. The elastic strain in the sensitive member causes a proportionate change in the electrical resistances of the attached strain gauges, and the latter are connected in an electrical measuring circuit to deflect a pointer, light spot or other indicating device so that an indication of the load is given.

Such known cells suffer from the disadvantage that the sensitivity of the cell is dependent on the mode of application of the load, and simple uncompensated electrical resistance strain gauge load cells may give large errors if the loading conditions vary from the loading conditions prevailing during calibration of the cell. Attempts have been made to avoid this disadvantage by mechanical means that either restrict the load on the sensitive member to one particular distribution or have the effect of averaging the load over a considerable portion of the sensitive member. All of these means involve complication of structure which generally makes the cell less robust or limits its field of use. A further disadvantage of those methods that attempt to correct for the anomalies in sensitivity by averaging the load over a particular region of the load-sensitive member is that there is a highly concentrated stress distribution in this region and, thus, for a cell of any given sensitivity, the loading range is reduced as compared with a cell of more simple construction where the load-dependent stress is uniformly spread over the sensitive member.

The load-dependent output signal of the electrical circuit incorporating the electrical resistance strain gauges is a function of the mechanical strain that arises from the loading of the cell, and this is detected by strain gauges which have their sensitive direction oriented so as to detect a selected component of this strain. Under conditions of loading other than distributed loading, the pattern of strain is altered and this causes variations in the output signal in simple cells as hitherto employed. In association with the axial strains generated by the load there is set up a proportionately dependent circumferential strain distribution.

An object of the invention is to provide an improved cell compensated so that its accuracy of calibration will be substantially maintained irrespective of the manner of application of the load, be it a distributed load or a concentrated load imposed centrally or off-axis and asymmetrically.

According to the present invention there is provided an electrical resistance strain gauge load cell in which a load-sensitive member is fitted with two sets of electrical gauges (herein referred to as active strain gauges and compensating strain gauges) the compensating strain gauges being so disposed and so connected in the electrical circuit of the active strain gauges that they ensure that the output signal is substantially independent of the manner in which the load is applied to the cell. Preferably the active strain gauges are axially disposed and the compensating strain gauges are at right angles to the active strain gauges which are advantageously circumferentially disposed on a cylindrical load-sensitive member, which may be hollow or solid.

In an advantageous arrangement, the compensating strain gauges are connected in a circuit so as to compensate for variations in the temperature of the cell, these said compensating strain gauges being attached to the same part of the cell as the active gauges so that all strain gauges are together in a substantially isothermal region in the cell.

It is preferred that the numbers of the load-sensitive or active strain gauges and their associated circumferentially directed compensating gauges are so chosen (within the limits of compatibility for the given electrical circuit) and the symmetry of the pattern of the gauges is so arranged, that the response to high local concentrations of strain due to point or line loading is averaged over several strain gauges with the result that the cell is independent of the degree of load concentration. Further and optional features of the invention appear from the following description and the claims.

By way of example the invention is illustrated in the accompanying drawings in which:

Figure 8 is a diagram of the inner surface of a load-sensitive cylinder with experimental gauge patterns, and Figure 9 is a graph showing the distance between the gauge circles and the midpoint circle plotted against sensitivity error under a concentrated central load.

Figure 1:
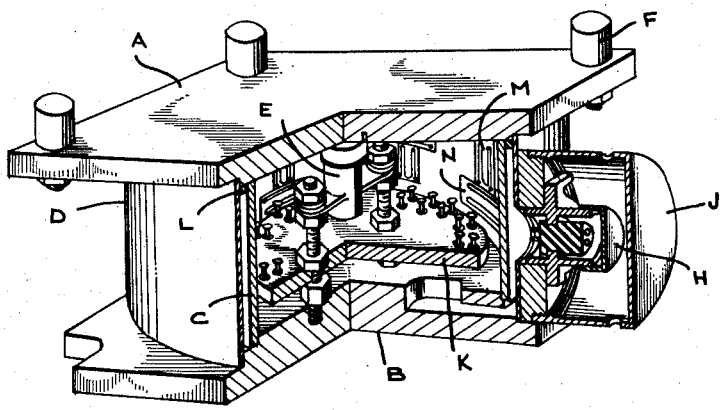
Figure 1 is a cut-away perspective view of an electrical resistance strain gauge load cell for use with pit props.

Referring to Figure 1 of the said drawings, showing a cut-away view of the load cell as designed for use with pit props, the load cell comprises a load-sensitive member in the form of a ⅛" thick high tensile steel cylinder C which is 2 inches high. It is protected from rough handling by a tough outer case D and it is carefully machined and ground to fit the top end cap A and lower end cap B, which caps take the applied load. Four lugs on the top end cap A and the corner cut-outs on the lower end cap B enable the cell to be easily mounted on a standard pit prop. There are 16 electrical strain gauges M and N attached to the inner surface of the steel cylinder C, and being inside the cylinder they receive extra protection from damage due to rough handling. Eight "active" strain gauges M are mounted with their sensitive directions parallel to the axis of the cylinder C, while eight circumferential compensating gauges N are mounted with their sensitive directions circumferentially disposed i.e. perpendicular to the axial gauges M.

Figure 2:
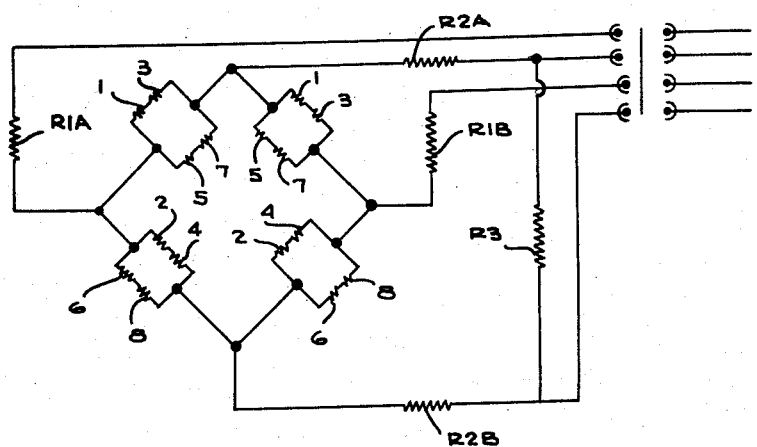
Figure 2 is a circuit diagram of the strain gauge connections for the load cell of Figure 1.
Figure 3:
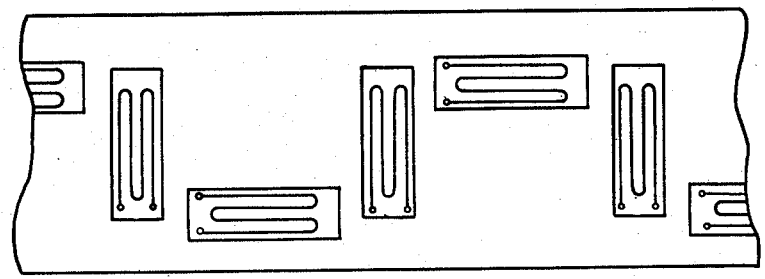
Figure 3 is a dimensioned plan of the strain gauge arrangement on the inner wall of a load-sensitive hollow cylinder, giving a cell output signal which is independent of the type of load applied.

The strain gauges M and N are electrically connected to a central spider K, the connections being made so that a complete resistance strain gauge bridge is contained within the cell. The circuit diagram is shown in Fig. 2. The connections to the four terminals of the network are taken to the pins of a connector H which is mounted on the protective casing. This outlet connector H is protected by a screw cap J from dust and knocks. A lead from the measuring device is plugged into the connector H when it is desired to make a measurement.

The anomalies in the load-dependent sensitivity of a simple uncompensated cell as between distributed and various concentrated end loading conditions may be explained as follows. The end caps A and B, dishing under the different end load distributions, cause the rims of the load-sensitive cylinder C to be forced outwards in varying amounts. Patterns of axial and circumferential strains are thus generated which affect the strain gauges M and N, with the result that unless the cell is compensated, its sensitivity varies with the nature of these end loads.

The present invention makes it possible to eliminate these changes in sensitivity by selecting a gauge pattern in which the circumferential strain gauges N are so placed that the effects of the additional circumferential strains, arising from deformation of the end caps A and B due to irregular loading, cancel out the effects of the unwanted strains affecting the axial gauges M.

Figure 4:
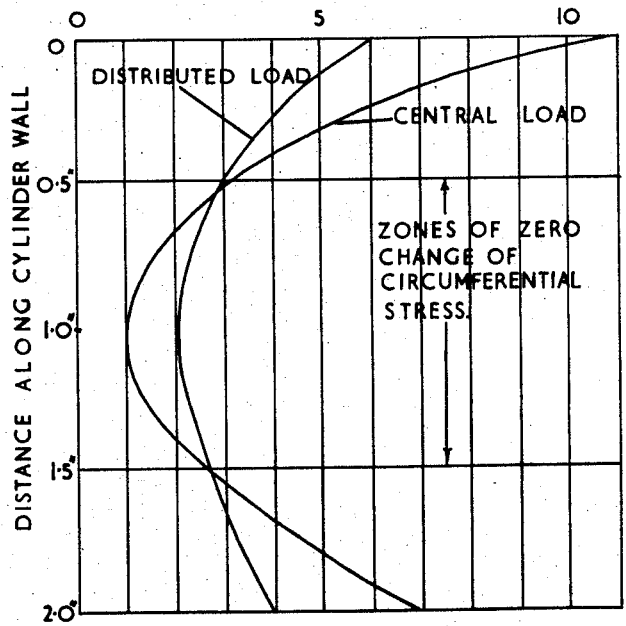
Figure 4 is a graph showing deformation of the cylinder wall under different end load distributions.

The method of compensation may be explained more clearly by considering the special case of concentrated central axial end loading as compared with distributed axial end loading. Here it has been established experimentally and confirmed by mathemetical analysis that there are two zones where the change in circumferential strain due to these modes of end loading approaches zero, as illustrated in Fig. 4. The circumferential "compensating" strain gauges N are mounted near these zones, in positions such that they are effected by small circumferential strains that compensate for the errors arising from the undesired bending and circumferential strains experienced by the axial "active" gauges.

In the cases of non-axial concentrated end loads the picture is more complex, but it may be assumed that, for any axially directed element of the load-sensitive cylinder, a strain pattern is developed similar to that shown in Figure 4, but of varying magnitude around the circumference. In these cases outputs of the axial strain gauges M and the associated correcting outputs of the circumferential gauges N are averaged out over the whole gauge pattern, with the result that the integrated output signal of the cell is independent of the particular mode of end loading.

Figure 5:
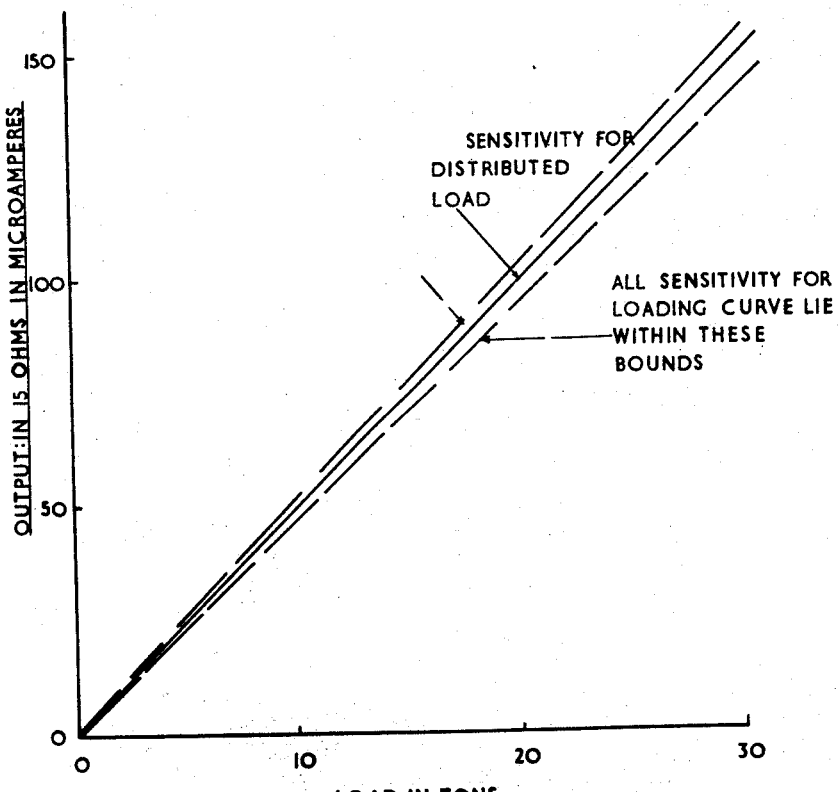
Figure 5 is a sensitivity curve for distributed load as compared with deviations for various concentrated central loads applied through a disc 1¼" in diameter.
Figure 6:
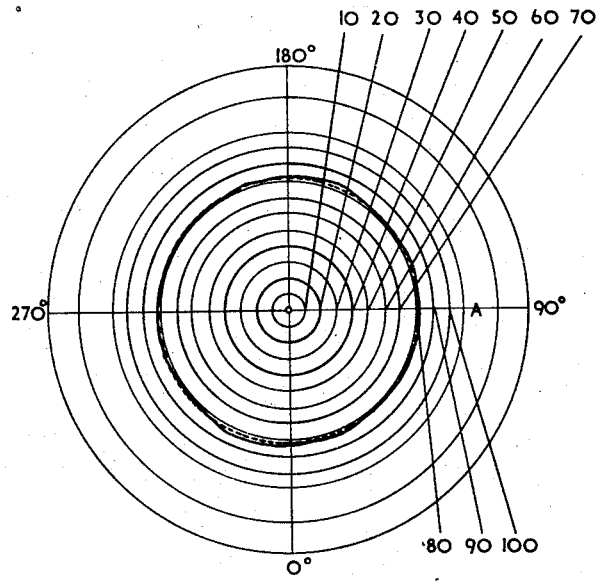
Figure 6 is a polar diagram of the load cell under a strip load of 16 tons applied at the top through a ¼" strip placed diametrically across the load cell, which has a distributed load over the bottom.
Figure 7:
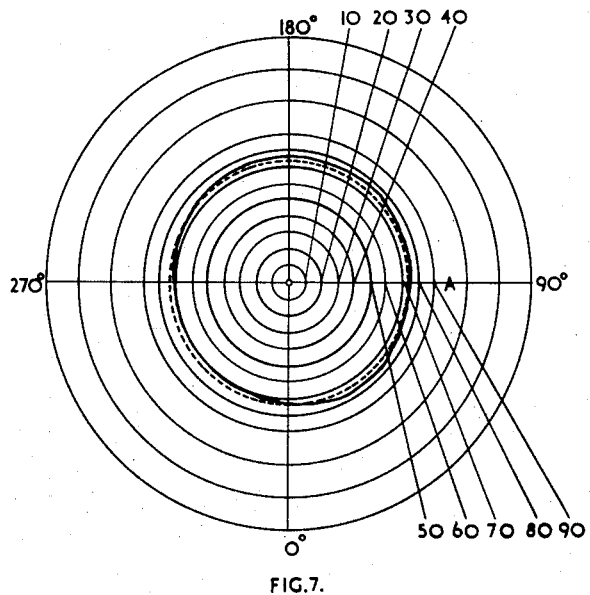
Figure 7 is a polar diagram of the load cell under an asymmetrical load of 16 tons applied at the top through a disc 1¼" from the axis, the load cell having a distributed load over the bottom.

Experimental confirmation of the above discussion is given in the load-sensivity diagrams displayed in Figures 5, 6 and 7.

It will be understood that modifications may be introduced into the invention as described above, for example, as one possible alternative a smaller load-sensitive cylinder may be used with the strain gauges arranged both on its inner and outer surfaces. Complete compensation may again be obtained by suitable choice of the gauge pattern, when the mechanism of correction will be on the same lines as that given.

As a still further alternative, it is not essential that the load-sensitive element be a cylindrical shell as a solid billet could be used instead. A suitable gauge pattern may then be chosen for the surface of the load sensitive element again giving compensation for various types of end loading. This type of cell would be useful for very high loadings as it would have to be of large diameter to accommodate the necessary number of electrical strain gauges.

While the invention is envisaged as being of particular application to the measurement of loads on pit props for mining, it will, however, have other applications to electrical weighing and force measurement generally. It may be adapted to many of these requirements by redesign of the form of the end caps A and B.

By the means described it is thus possible to make force or load measurements with an electrical resistance strain gauge load cell of simple design with an accuracy that is substantially independent of the manner in which the load is applied to the cell.

In putting the invention into effect the positions of the compensating strain gauges may be determined by calculation and/or by an empirical method.

The critical design parameters involved in applying the invention to the design of an end-loaded electrical resistance strain gauge load cell of given geometry, so that it may be independent of the degree of concentration or mode of application of the load are (i) the precise positioning of the circumferential compensating gauges with respect to the axially-directed gauges and (ii) the total number of gauges of each type must be employed in the gauge pattern.

It is first necessary to design the mechanical components of the cell so that there will be adequate strain in the load-sensitive member over the designed load range. When the geometry of the load-sensitive component of the cell is known, the gauge positions may be determined by calculation, but this is rather laborious and an empirical method is generally quicker and more convenient.

An empirical technique suitable for the design of the practical load cell described above and illustrated in Figure 1 is described below.

The active members of the load cell are the thin-walled right circular cylinder C which is the load-sensitive member and the two stout end plates A and B to which the load is applied. These three parts are made from a good high tensile steel. To obtain the required experimental data, exact geometrical copies of the active members are employed, but these need not necessary be made of the same material as the final version of the cell. It can be shown that the gauge pattern for complete compensation of the cell is a function of its geometry alone, if elastically homogeneous materials are employed.

Throughout the following discussion it is assumed that the standard load, which is the load under which the cell will be calibrated, is a distributed load applied to both end plates, reference should now be made to Fig. 8 where a number of trials gauge patterns on the inner wall of the cylinder are shown. It will be seen that the axially-directed gauges A are evenly spaced around the cylinder with their electrical centres lying on the midpoint circle. These arrangements of circumferentially directed or compensating gauges C are shown. In one of these the axes of the gauges lie on the midpoint circle. For each of the other two arrangements the circumferential gauges are evenly spaced and arranged to lie alternately above and below the midpoint circle at equal distances from it. Thus for each particular pattern, these compensating gauges lie on either one or the other of two circles, called gauge circles, one above and one below the midpoint circle and equidistant from it, this distance varying for each arrangement. The first arrangement may be regarded as a zero distance pattern. In each experiment or trial, the axial gauges (of which there are four) are associated with one of the sets of four cricumferential gauges to form a Wheatstone bridge. It should be noted that here it is not necessary at this stage to employ the full complement of gauges that will be essential in the final version of the cell.

Each trial pattern thus comprises eight strain gauges, four axial and four compensating. There are two extreme arrangements that will give large errors of opposite sign for top and bottom central concentrated loading as compared with the standard load conditions, and a third arrangement that will give a small error. The cell is tested under load to determine its sensitivity error for central concentrated loading against the standard distributed loading in each of these three cases, when a curve relating the distance between the midpoint circle and gauge circles for each arrangement and the sensitivity discrepancy under concentrated load may be drawn.

Referring again to Fig. 8, in the one extreme position (C-1) the circumferential gauges all lie on the midpoint circle. In this position, the sensitivity under concentrated central load will be low, giving a cell with a negative error. In the other extreme position (C-2) the circumferential gauges circles are close to the top and bottom rims of the cylinder. The distance from the midpoint circle, equal for both top and bottom gauge circles, is designated by "a." The sensitivity of the cell will now be greater under central concentrated loading than under distributed loading, giving a positive error. For the third trial, an intermediate position (C-3) is chosen. In this case, the circumferential gauge circles are half-way between the midpoint circle and the top and bottom gauge circles for the second extreme case. The distance from the midpoint circle is now designated by $$"b" = \frac{a+}{2}$$

With this arrangement, the sensitivity for concentrated central loading will have a small positive or negative error.

The observed errors and the associated distance of the gauge circles from the midpoint circle are now plotted as shown in Fig. 9. The best curve to fit the three points is drawn in by hand. As a guide it may be said the arc of a circle drawn through these points will give a reasonable approximation to the correct curve.

The point at which the fitted curve cuts the axis of zero error may now be obtained, and another test cylinder should be fitted with strain gauges using this dimension. If, under test, there is still a small difference in sensitivity between concentrated central loading and standard loading, then the curve should be replotted to pass through these newly determined co-ordinates. The point at which this curve cuts the axis of zero error should now be noted and another set of four circumferential gauges placed in the positions indicated. The discrepancy between concentrated central and distributed loading should now be negligible, but if a very accurate load cell is required the procedure may be repeated.

Data has now been obtained to make the cell independent of the degree of concentration of load axially applied to the top and bottom end plates. It has still to be compensated for asymmetrical, concentrated off-axial or strip loads. Sensitivity variations under such loads may be reduced or eliminated by increasing the number of gauges in the bridge pattern. It is necessary to determine the minimum number of gauges sufficient for this purpose.

A diametrical strip load is now applied to one end plate and a distributed load to the other and the sensitivity of the cell is determined for a number of angular positions of the strip as it is rotated about vertical axis of the cylinder. Examination of the polar diagram plotted from these results will indicate whether or not the number of gauges needs to be increased. The cell shown in Figure 1 has eight axial and eight circumferential gauges, which gives very good compensation and makes the cell independent of loading conditions within close limits.

The empirical technique just described may be applied directly to any hollow cylindrical load cell with flat top and bottom end plates to determine the arrangement of gauges to give a fully compensated cell. It should be noted that neither the compensating gauges nor the active gauges need to be confined to the inner surface of the load-sensitive cylinder. By using both surfaces, a large number of gauges may be employed for a cell of given dimensions and thus the compensation can be improved, or the same number of gauges may be employed in a smaller cell.

The technique may be modified to determine correcting gauge patterns for load-sensitive member of types other than the hollow right circular cylinder.

We claim:

1. Load measuring apparatus responsive to the application thereto of a load in a particular direction, comprising a hollow load element sensitive to the application of such a load, a first plurality of electrical-resistance strain gauges mounted on said element and arranged with the strain sensitive direction of the gauges of said first plurality extending in the direction in which the apparatus is responsive to loading, and a second plurality of electrical-resistance strain gauges mounted on said element and arranged with the strain-sensitive direction of the gauges of said second plurality extending transversely of the direction in which the apparatus is responsive to loading, the gauges of said second plurality each being situated at a zone on said element where there is minimum change of strain in the direction in which the gauges of said second plurality are sensitive between the conditions of concentrated loading and distributed loading of the apparatus.

2. Load measuring apparatus responsive to the application thereto of a load in a particular direction, comprising a hollow load element sensitive to the application of such a load, a first plurality of electrical-resistance strain gauges mounted on said element and arranged with the strain sensitive direction of the gauges of said first plurality extending in the direction in which the apparatus is responsive to loading, and a second plurality of electrical-resistance strain gauges mounted on said element and arranged with the strain-sensitive direction of the gauges of said second plurality extending transversely of the direction in which the apparatus is responsive to loading, the gauges of said second plurality each being mounted on said element at a position where the change of strain in the strain-sensitive direction of the gauge between the condition of concentrated loading and distributed loading of the apparatus is such as to induce in said gauge a reaction which will compensate for the change of strain in the strain-sensitive direction of the gauges of said first plurality between said conditions of loading.

3. Load measuring apparatus responsive to the application thereto of a load in a particular direction, comprising a hollow load element sensitive to the application of such a load, a first plurality of electrical-resistance strain gauges mounted on said element and arranged with the strain sensitive direction of the gauges of said first plurality extending in the direction in which the apparatus is responsive to loading, and a second plurality of electrical-resistance strain gauges mounted on said element and arranged with the strain-sensitive direction of the gauges of said second plurality extending transversely of the direction in which the apparatus is responsive to loading, the gauges of said second plurality each being situated at a zone on said element where there is minimum change of strain in the direction in which the gauges of said second plurality are sensitive between the conditions of concentrated loading and distributed loading of the apparatus, the gauges of each plurality being equidistantly spaced around said element and the gauges of said first plurality each being situated between adjacent gauges of said second plurality.

4. Load measuring apparatus responsive to the application thereto of a load in a particular direction, comprising a hollow load element sensitive to the application of such a load, a first plurality of electrical-resistance strain gauges mounted on said element and arranged with the strain sensitive direction of the gauges of said first plurality extending in the direction in which the apparatus is responsive to loading, and a second plurality of electrical-resistance strain gauges mounted on said element and arranged with the strain-sensitive direction of the gauges of said second plurality extending transversely of the direction in which the apparatus is responsive to loading, the gauges of said second plurality each being mounted on said element at a position where the change of strain in the strain-sensitive direction of the gauge between the condition of concentrated loading and distributed loading of the apparatus is such as to induce in said gauge a reaction which will compensate for the change of strain in the strain-sensitive direction of the gauges of said first plurality between said conditions of loading, the gauges of each plurality being equidistantly spaced around said element and the gauges of said first plurality each being situated between adjacent gauges of said second plurality.

5. Load measuring apparatus comprising a load sensitive cylindrical shell, a first plurality of electrical resistance strain gauges mounted on and extending axially of said shell, and a second plurality of electrical resistance strain gauges mounted on and extending circumferentially of said shell, the gauges of said second plurality each being situated at a position on said shell where there is minimum change of circumferential strain between the conditions of concentrated loading and distributed loading of the apparatus.

6. Load measuring apparatus comprising a load sensitive cylindrical shell, a first plurality of electrical resistance strain gauges mounted on and extending axially of said shell, and a second plurality of electrical resistance strain gauges mounted on and extending circumferentially of said shell, the gauges of said second plurality each being situated at a position on said shell where there is minimum change of circumferential strain between the conditions of concentrated loading and distributed loading of the apparatus, and the two pluralities of gauges being in a substantially isothermal region of the apparatus.

7. Load measuring apparatus comprising a load sensitive cylindrical shell, a first plurality of electrical resistance strain gauges mounted on and extending axially of said shell, and a second plurality of electrical resistance strain gauges mounted on and extending circumferentially of said shell, some of the gauges of each plurality being mounted on the external circumferential surface of said shell and the remainder of the gauges of each plurality being mounted on the internal circumferential wall of said shell, and the gauges of said second plurality each being situated at a position on said shell where there is minimum change of circumferential strain between the conditions of concentrated loading and distributed loading of the apparatus.

8. Electrical load measuring apparatus comprising a hollow load sensitive element having a deformable wall, a first plurality of electrical resistance strain gauges mounted on and distributed symmetrically over said wall and having their strain sensitive directions parallel to the general direction in which the main load is to be applied, a second plurality of electrical resistance strain gauges with their strain sensitive directions arranged transverse to said first plurality, each member of said second plurality being located between two immediately adjacent members of said first plurality and successive members of said second plurality being located alternately above and below the midpoint of the immediately adjacent members of said second plurality, the members of said second plurality being located in the vicinity of zones on the wall where the change in strain in the direction of the strain sensitive directions of the gauges of said second plurality between distributed and concentrated loading is a minimum.

9. Electrical load measuring apparatus comprising a thin-walled metal cylinder forming a load sensitive element, a first plurality of electrical resistance strain gauges for measuring the axial load mounted on and distributed symmetrically around the curved wall of the cylinder and having their strain sensitive directions parallel to the axis of the cylinder, a second plurality of electrical resistance strain gauges having their strain sensitive directions arranged transverse to said first plurality, each member of said second plurality being arranged between two immediately adjacent members of said first plurality, and successive members of said second plurality being located alternately above and below the midpoint of the immediately adjacent members of said second plurality, the members of said second plurality being located in the vicinity of zones on the said curved wall where the change in circumferential strain between distributed and concentrated loading of the apparatus is a minimum.

References Cited in the file of this patent
UNITED STATES PATENTS

| | | |
|---|---|---|
| 2,472,047 | Ruge | May 31, 1949 |
| 2,747,408 | Boytim et al. | May 29, 1956 |